US010652976B2

(12) United States Patent
Rhodes et al.

(10) Patent No.: US 10,652,976 B2
(45) Date of Patent: May 12, 2020

(54) METHOD AND APPARATUS FOR MONITORING AND COMMANDING LIGHTING SYSTEMS AND THEIR ASSOCIATED CONTROLS

(71) Applicant: Illum Technology, LLC, Mesa, AZ (US)

(72) Inventors: James V. Rhodes, Mesa, AZ (US); Robby L. Madruga, Peoria, AZ (US); David A. Martinez, Mesa, AZ (US)

(73) Assignee: Illum Horticulture LLC, Mesa, AZ (US)

( * ) Notice: Subject to any disclaimer, the term of this patent is extended or adjusted under 35 U.S.C. 154(b) by 0 days.

(21) Appl. No.: 16/182,301

(22) Filed: Nov. 6, 2018

(65) Prior Publication Data

US 2019/0141800 A1    May 9, 2019

Related U.S. Application Data

(60) Provisional application No. 62/582,826, filed on Nov. 7, 2017, provisional application No. 62/584,881, filed on Nov. 12, 2017.

(51) Int. Cl.
| | |
|---|---|
| *H05B 37/02* | (2006.01) |
| *H05B 45/00* | (2020.01) |
| *H02J 7/00* | (2006.01) |
| *H05B 47/19* | (2020.01) |
| *F21Y 115/10* | (2016.01) |

(52) U.S. Cl.
CPC .............. *H05B 45/00* (2020.01); *H02J 7/007* (2013.01); *H05B 47/19* (2020.01); *F21Y 2115/10* (2016.08); *H02J 7/00* (2013.01)

(58) Field of Classification Search
CPC ........... H05B 37/0245; H05B 37/0254; H05B 37/0263; H05B 37/0272
USPC ....................................... 315/152, 307, 312
See application file for complete search history.

(56) References Cited

U.S. PATENT DOCUMENTS

| | | | | |
|---|---|---|---|---|
| 9,210,778 | B2 * | 12/2015 | Chen ...................... | H05B 47/19 |
| 2016/0234912 | A1 * | 8/2016 | Smith .................... | H05B 47/19 |
| 2016/0327227 | A1 * | 11/2016 | Green, Jr. ............. | F21S 10/043 |
| 2018/0066816 | A1 * | 3/2018 | Clark ...................... | F21V 5/04 |
| 2018/0084733 | A1 * | 3/2018 | Adams ............... | H05B 33/0827 |
| 2018/0263095 | A1 * | 9/2018 | Wray ................. | H05B 37/0245 |

* cited by examiner

*Primary Examiner* — Tung X Le
(74) *Attorney, Agent, or Firm* — Michael T. Wallace

(57) ABSTRACT

A method and apparatus for a wirelessly controlled, battery powered, universal serial bus (USB) charged, digital multiplex (DMX) master controller with remote device management (RDM) capability. The DMX controller includes a single DMX interface for DMX mastering that is RDM compliant. The DMX controller includes an optional DMX interface that may be used to allow miscellaneous data transfer that may not only include light intensity control information, but other non-lighting control information between serially connected devices using only DMX as a form of communication in a "token ring" arrangement.

18 Claims, 4 Drawing Sheets

METHOD AND APPARATUS FOR MONITORING AND COMMANDING LIGHTING SYSTEMS AND THEIR ASSOCIATED CONTROLS

FIELD OF THE INVENTION

The present invention generally relates to lighting systems, and more particularly to the controls associated with monitoring and commanding lighting systems.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

Whether the particular lighting solution is applied in a commercial application (e.g., theatrical or horticultural) or simply applied in a residential setting, command and control of such lighting is becoming increasingly complex. For example, simple "on/off" commands with conventional LED lighting are no longer sufficient. Rather, variations in lighting intensity between "on" and "off" are more the norm where multiple intensity levels between 0% and 100% may be selected. Further, color temperature of the generated light may be further desirable and, therefore, selectable.

Conventional command and control consoles for LED lighting typically require an alternating current (AC) power supply and further require a computing station tethered to the command and control console. As a result, conventional command and control consoles are non-mobile and have rigid connectivity requirements for operation, which may render them useful for one particular application, but useless for any number of other applications.

Efforts continue, therefore, to develop a command and control device for an LED lighting system that may be utilized in any number of applications without the need to be tethered to any particular power and/or connectivity arrangement.

SUMMARY

To overcome limitations in the prior art, and to overcome other limitations that will become apparent upon reading and understanding the present specification, various embodiments of the present invention disclose methods and apparatus for the monitoring and commanding of LED-based lighting systems along with their associated control mechanisms.

In accordance with one embodiment of the invention, a lighting controller comprises a battery configured to provide operational power, a CPU coupled to receive the operational power from the battery and a first DMX interface coupled to the CPU and configured to transmit DMX data received from the CPU. The DMX data is received wirelessly by the CPU.

In accordance with an alternate embodiment of the invention, a network comprises a DMX universe, a DMX controller coupled to the DMX universe. The DMX controller includes a first DMX interface configured to receive data from the DMX universe and a second DMX interface configured to transmit data to the DMX universe. The network further comprises a mobile device wirelessly coupled to the DMX controller, the mobile device including a display configured to display the data received from the first DMX interface.

In accordance with an alternate embodiment of the invention, a method of using a DMX controller comprises providing power to the DMX controller using a battery, charging the battery with power received from a USB port, configuring the DMX controller to receive DMX control data and transmitting the received DMX control data to a DMX universe.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to a Bluetooth mobile application controlled, universal serial bus (USB) battery-powered and charged, digital multiplex (DMX) master controller with remote device management (RDM) capability. The DMX controller may include a single DMX interface for DMX mastering that may be RDM compliant. The DMX controller may optionally include a second DMX interface that may be used, for example, to allow miscellaneous data transfer that may not only include DMX-type information (e.g., light intensity control information), but other non-lighting control information (e.g., DMX device name/label information, software version executing on the DMX device, etc.) between serially connected devices using only DMX as a form of communication.

The DMX controller may include a wireless interface, such as a Bluetooth interface that may support both Android-based and iOS-based mobile communications (e.g., via mobile phone, electronic tablet, etc.) to allow remote control of the DMX controller via a mobile communications device. Wi-Fi connectivity may also be provided within the DMX controller, which may support ArtNET and streaming architecture for control networks (sACN).

The DMX controller may include a wired interface such as universal serial bus (USB) that may be utilized, for example, to allow wired connectivity to a computing device. In one embodiment, a sequence of lighting segments (e.g., lighting shows) may be executed from such a computing device as commanded over the USB link. In addition, configuration and boot loading of the controller's firmware may be accomplished over the USB link as well.

A basic mode of operation may include hand-held test functionality, which may include a full RDM handler, DMX write capability and DMX monitor capability. The DMX controller may act as an ArtNET/sACN endpoint to provide DMX mastering and bi-directional RDM passthrough. The DMX controller may operate in a Bluetooth and/or Wi-Fi enabled stage mode to provide DMX mastering with RDM support and a "set and walk away" mode, whereby the last received DMX command is held active on the DMX universe.

Figure 1:
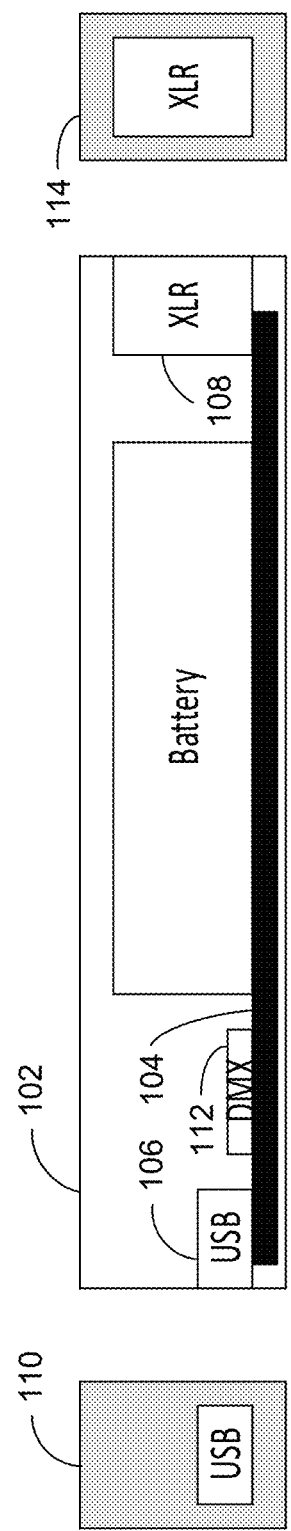
FIG. 1 illustrates a mechanical arrangement for a command, control and monitoring device in accordance with one embodiment of the present invention.

In one embodiment, as illustrated in FIG. 1, DMX controller 100 may be encased within a physical enclosure (e.g., plastic casing 102), so that wireless modules (e.g., Bluetooth and Wi-Fi modules not shown) may be operational within casing 102 without the need for external antennas. One or more PCBs (e.g., single PCB 104) may span the entire unit with all electronics soldered on one side of PCB 104.

For example, one side of PCB 104 may be populated with a universal serial bus (USB) connector 106 and the other side of PCB 104 may be populated with an XLR connector 108 for DMX connectivity (e.g., via external XLR connecter 114 and DMX interface 112). In one embodiment, XLR connector 108 may include multiple pins (e.g., 3 to 5 pins) which may provide half-duplex and/or full-duplex DMX communications in support of the remote device management (RDM) protocol. A customized communication protocol that may be supported by a 5-pin XLR connector and a second DMX interface (not shown) may, for example, allow miscellaneous data transfer that may not only include light intensity control information, but other non-lighting control information (e.g., DMX device description) between serially connected devices using only DMX as a form of communication. Bluetooth and WIFI module(s) (not shown) may be included inside enclosure 102 and may be disposed as close to USB 106 as possible for optimal radio performance.

Figure 2:
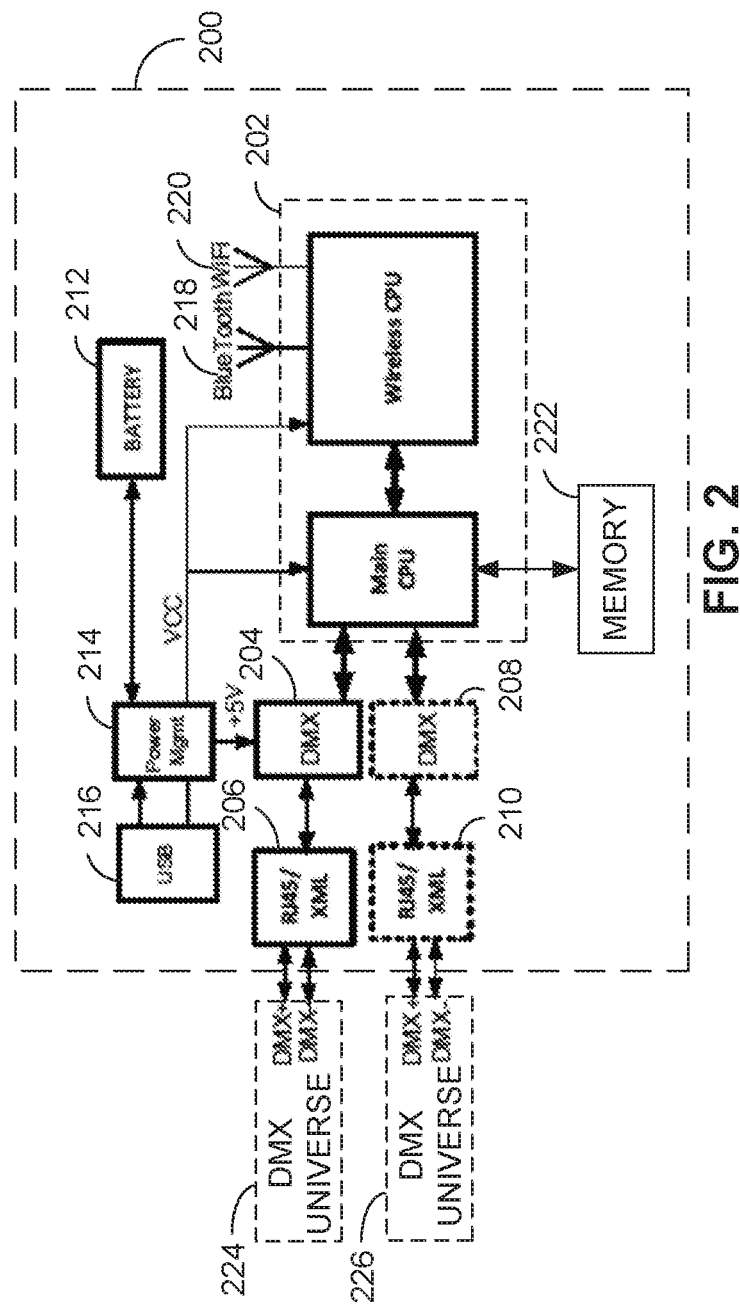
FIG. 2 illustrates a block diagram for a command, control and monitoring device in accordance with one embodiment of the present invention.

In one embodiment, as exemplified in FIG. 2, the wireless modules may be incorporated within a single, wireless-capable central processing unit (CPU) 202, which may include both Bluetooth and Wi-Fi connectivity along with one or more wired DMX interfaces. A first DMX interface may, for example, support DMX master communication via DMX interface 204 and RJ45/XLR connector 206. A second DMX interface may optionally be provided via DMX interface 208 and RJ45/XLR connector 210, such that a second DMX universe may be commanded/controlled and/or monitored. The second DMX interface may also be used to interconnect DMX controller 200 serially within any DMX universe, whereby the first DMX interface may be used to receive/transmit a command (e.g., a non-lighting command on a DMX-based "token ring" network) on the DMX bus and the second DMX interface may be used to transmit/receive the command to the remaining devices in the DMX universe. In this way, for example, "token ring" communications may be established between each device in the DMX universe when only a DMX interface may be providing connectivity between each device in the DMX universe. Accordingly, general status and control information of each channel may be circulated throughout the DMX universe via a DMX communication protocol to facilitate, for example, monitoring of the status of each channel of the DMX universe using a monitoring device (e.g., a mobile device) that may have access to the general status and control information circulating throughout the DMX universe.

Operational power may be provided, for example, via a computing device (not shown) that may be connected to USB 216. The operational power may be regulated via power management 214 and supplied to CPU 202, DMX 204, DMX 208 and any other device that may need operational power within DMX controller 200. A battery 212 may also be employed within DMX controller 200 to supply operational power to DMX controller 200 when no power is being supplied via USB 216. In such an instance, power management 214 may provide charging and management control electronics to charge battery 212 using power received via USB port 216 and to protect battery 212 from over-voltage/reverse-voltage conditions as well as from transient events (e.g., electrostatic discharge events).

DMX controller 200 may include both transmit and receive capability whereby DMX interface 204 may transmit and receive DMX data (e.g., half-duplex RS-485 data transfer). In alternate embodiments, DMX interfaces 204 and 208 may, for example, be combined to provide full-duplex RS-485 data transfer. DMX controller 200 may be fully RDM compliant and may offer all RDM capability via the wireless interface (e.g., Bluetooth mobile application and/or the ArtNET/sACN Wi-Fi portal) whereby DMX controller 200 may operate in a bridge mode to exchange DMX information with the ArtNET/sACN portal and vice versa.

CPU 202 may be responsible for managing DMX communications flow (e.g., manage DMX receive and transmit packets), setting lighting intensities and providing a user interface to an external graphical user interface (GUI) that may be hosted on a GUI-capable device (e.g., smartphone or computing device). CPU 202 may host a USB communications port 216, which may allow the internal program (e.g., firmware) executed by CPU 202 to be changed (e.g., boot loaded). In addition, USB communication port 216 may allow user programmable parameters to be selected via a GUI interface that may be operationally connected to USB port 216.

Modes of operation of DMX controller 200 may include a "set and forget" master mode, whereby DMX controller 200 may be commanded (e.g., via USB 216, Bluetooth 218 and/or Wi-Fi 220) to set all 512 channels of one or more DMX universes (e.g., a first DMX universe 224 as commanded by DMX interface 204 and a second DMX universe 226 as commanded by DMX interface 208) to a fixed, static level. As discussed above, DMX controller 200 may be powered via internal battery 212 or from a USB power connection at USB port 216.

Alternate modes of operation of DMX controller 200 may include a wireless ArtNET master bridge mode, whereby DMX controller 200 may receive data packets over Wi-Fi 220 using ArtNET and may bridge the reception of DMX data to one or more DMX ports (e.g., DMX port 204 and/or DMX 208). DMX universe configuration/selection and provisioning of the Wi-Fi network may be achieved via USB port 216 and/or Bluetooth interface 218.

Alternate modes of operation of DMX controller 200 may further include a wireless sACN master bridge mode, whereby DMX controller 200 may receive data packets over Wi-Fi 220 using sACN and may bridge the reception of DMX data to one or more DMX ports (e.g., DMX port 204 and/or DMX 208). DMX universe configuration/selection and provisioning of the Wi-Fi network may be achieved via USB port 216 and/or Bluetooth interface 218.

Alternate modes of operation of DMX controller 200 may further include a USB-connected master mode, whereby DMX commands may be originated via a computing device (e.g., a Windows-based or MAC-based hosted USB application) that may be connected to USB port 216. DMX controller settings (e.g., Wi-Fi provisioning or DMX universe selection) may be changed when DMX controller 200 may be connected to a Wi-Fi ArtNET or sACN enabled network. A simplified user interface may allow all 512 channels of each DMX universe to be selected using vertical sliders hosted on a GUI of the computing device. Lighting scenes generated by the one or more DMX universes as commanded by the computing device may be stored to a memory device (e.g., local Micro SD card plugged into memory slot 222). Status information (e.g., battery status, Wi-Fi signal strength) and all user settings may be provided to USB port 216 and displayed on the computing device (not shown) connected to USB port 216.

Alternate modes of operation of DMX controller 200 may further include a Bluetooth master mode, whereby DMX commands may be originated via a computing device (e.g., an Android or iOS connected mobile application) that may be connected wirelessly to Bluetooth 218. DMX controller settings (e.g., Wi-Fi provisioning or DMX universe selection) may be changed when DMX controller 200 may be connected to a Wi-Fi ArtNET or sACN enabled network. A simplified user interface may allow all 512 channels of each DMX universe (e.g., DMX universe 224 and/or DMX universe 226) to be selected using vertical sliders hosted on a GUI of the computing device. Lighting scenes generated by the one or more DMX universes (e.g., DMX universe 224 and/or DMX universe 226) as commanded by the computing device may be stored to a memory device (e.g., local Micro SD card plugged into memory slot 222). Status information (e.g., battery status, Wi-Fi signal strength) and all user settings may be provided to Bluetooth 218 and displayed on the computing device (not shown) connected to Bluetooth 218.

Alternate modes of operation of DMX controller 200 may further include a memory master mode, whereby once DMX commands are saved onto a memory device (e.g., a local Micro SD card plugged into memory slot 222), DMX controller 200 may be commanded (e.g., via USB port 216 and/or Bluetooth 218 and/or Wi-Fi 220) to "play" the scenes in a non-monitored operation with dynamic timed control of all 512 channels of each DMX universe (e.g., DMX universe 224 and/or DMX universe 226).

Alternate modes of operation of DMX controller 200 may further include a DMX bus monitor mode, whereby DMX controller 200 may monitor all DMX communications on one or more DMX universes (e.g., each DMX universe 224 and/or 226 as connected via DMX ports 204 and/or 208, respectively). Each of the monitored communications may then be displayed onto a computing device that may be connected via any of the USB 216, Bluetooth 218 or Wi-Fi 220 ports. Alternately, DMX controller 200 may be embedded within a "token ring" DMX network whereby lighting and/or non-lighting information may be received (e.g., via DMX port 204) and transmitted (e.g., via DMX port 208), whereby any information circulating within the "token ring" DMX network may be monitored and displayed onto a computing device that may be connected via any of the USB 216, Bluetooth 218 or Wi-Fi 220 ports.

Alternate modes of operation of DMX controller 200 may further include a RDM master mode, whereby DMX controller 200 may operate as a fully compliant RDM DMX master and may allow the viewing and controlling of all DMX information using a computing device that may be connected via any of the USB 216, Bluetooth 218 or Wi-Fi 220 ports.

Figure 3:
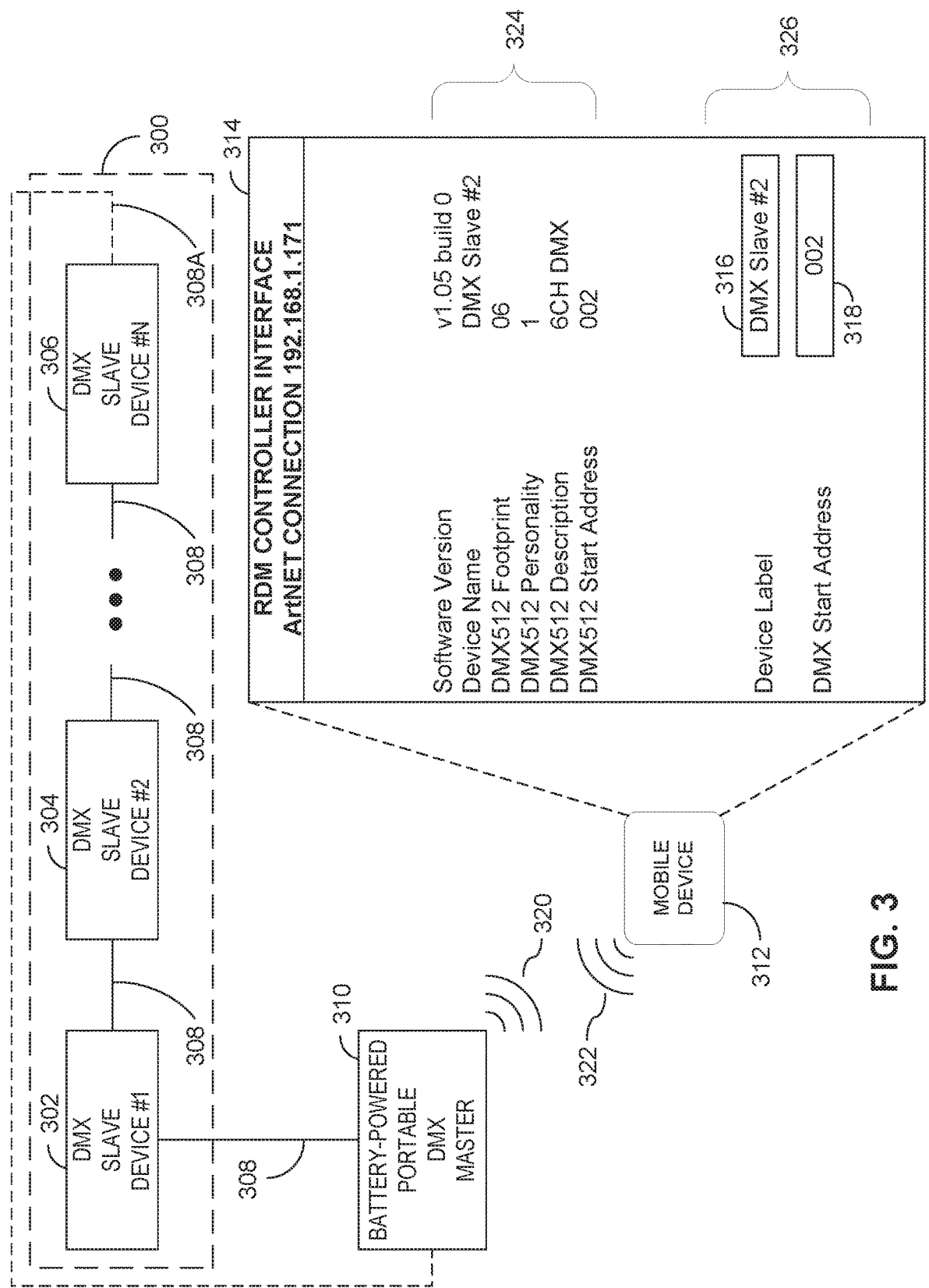
FIG. 3 illustrates a DMX universe under the control of a battery-powered, portable DMX controller in accordance with one embodiment of the present invention.

Turning to FIG. 3, for example, DMX universe 300 is illustrated which may contain one or more DMX slave devices (e.g., DMX slave devices 302, 304 and 306) interconnected in a daisy-chain fashion (e.g., via RS-485 connections 308 and associated XLR/RJ45 connectors not shown) and controlled by a battery-powered, portable DMX master device 310 operating as a fully compliant, RDM DMX master that may include Wi-Fi interface 320 supporting ArtNET and/or sACN protocols for transporting DMX information over Wi-Fi interface 320. Optional connection 308A may provide "token ring" interconnectivity between DMX slaves 302-306 and DMX master 310, whereby status and control information may be circulated throughout DMX universe 300 and selectively monitored (e.g., via mobile device 312) as discussed in more detail below.

Mobile device 312 may similarly be configured with an ArtNET/sACN enabled, Wi-Fi interface 322 that may used to monitor/control DMX information pertinent to DMX universe 300. In one embodiment, such monitored and controlled information may be displayed via a person-machine interface (PMI) 314 that may be customized to control/monitor all DMX slave devices that may exist within the DMX universe 300. For example, Wi-Fi interface 322 may communicate with Wi-Fi interface 320 to identify portable DMX master 310 as an ArtNET compliant device having a particular IP address (e.g., 192.168.1.171) within DMX universe 300.

DMX information associated with any of the DMX slave devices (e.g., DMX information associated with DMX Slave Device 304 as may be circulated by the "token ring" connectivity provided by connections 308 and 308A) within DMX universe 300 may be displayed within monitor area 324 of PMI 314. As per an example, the software version (e.g., "v1.05 build 0"), Device Name (e.g., "DMX Slave #2"), DMX512 footprint (e.g., "06"), DMX Personality (e.g., "1"), DMX Description (e.g., "6CH DMX") and DMX Start Address (e.g., "002") may identify some or all of the monitored information that may be relevant to DMX Slave Device 304 as may be circulated by the "token ring" connectivity provided by connections 308 and 308A.

DMX Slave Device 304 may, for example, require six independently addressable DMX channels in order to command each of its four lighting features (e.g., red, green, blue and white intensity levels) along with each of its two mechanical features (e.g., azimuth and elevation angles). Accordingly, for example, DMX Slave Device 304 may be characterized as having a DMX512 footprint of "06" and a DMX512 Description of "6CH DMX" as may be displayed within monitor area 324 of PMI 314.

In addition, DMX Slave Device 304 may include several features that may be configurable as may be displayed within configuration area 326 of PMI 314. As per an example, user configurable interface 316 may include a textual input box that may allow a user of mobile device 312 to change the Device Label (e.g., "DMX Slave #2") and the DMX Start Address (e.g., "002") that may be associated with DMX Slave Device 304. In such an instance, once the user of mobile device 312 updates configurable interface 326 with Device Label and/or DMX Start Address information, such information may be transmitted via ArtNET-compliant Wi-Fi interface 322 to portable RDM-compliant, DMX master device 310 via Wi-Fi interface 320 and then communicated via the RDM protocol over a DMX interface (e.g., RS-485 interface 308) to DMX Slave Device 304. Once received, DMX Slave Device 304 may update its internal memory with the configured information (e.g., Device Label and DMX Start Address) and may circulate the information via "token ring" connectivity established via connections 308 and 308A (e.g., for monitoring purposes).

Figure 4:
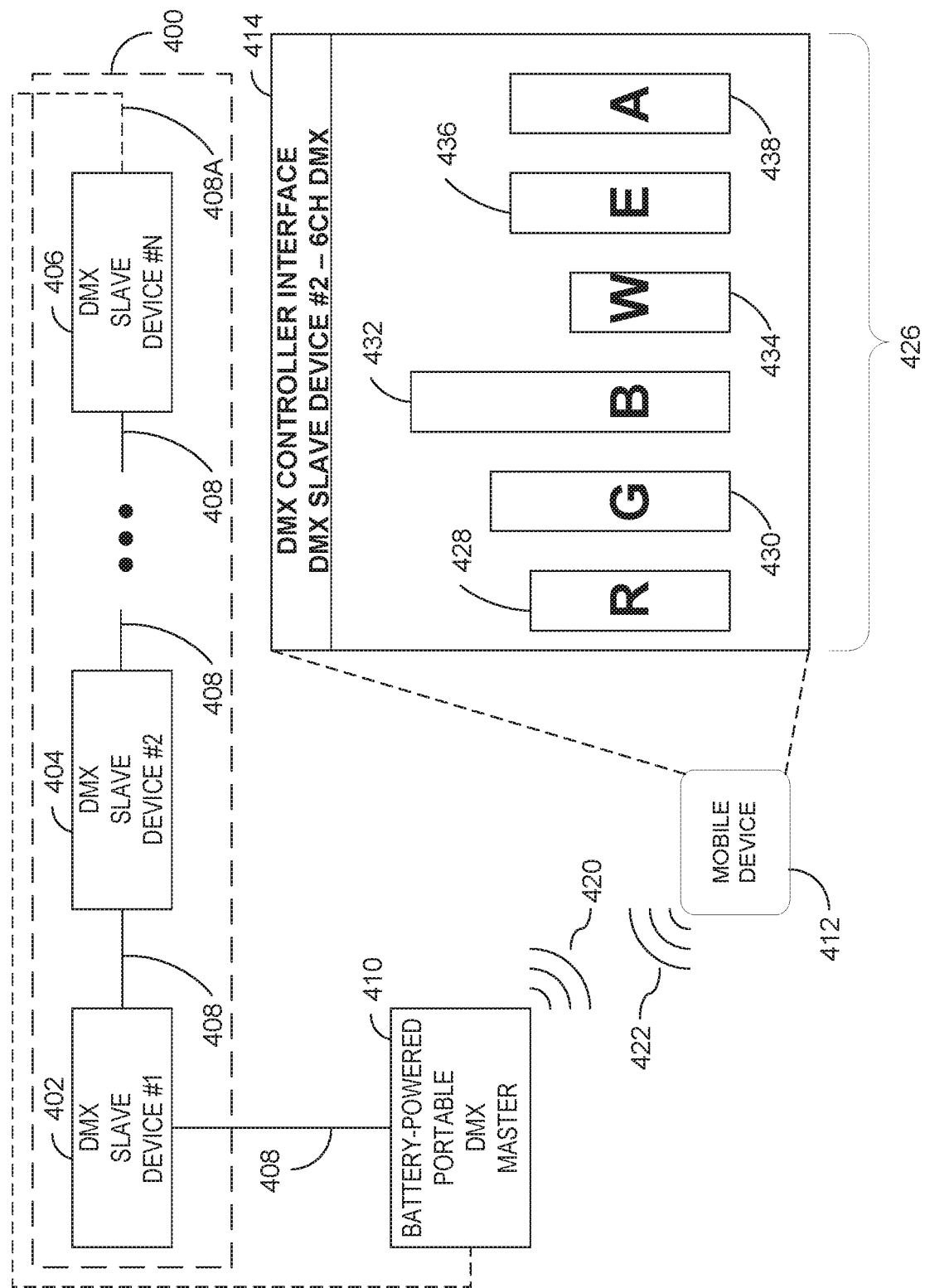
FIG. 4 illustrates a DMX universe under the control of a battery-powered, portable DMX controller in accordance with an alternate embodiment of the present invention.

Turning to FIG. 4, DMX universe 400 is illustrated which may contain one or more DMX slave devices (e.g., DMX slave devices 402, 404 and 406) interconnected in a daisy-chain fashion (e.g., via RS-485 connections 408 and associated XLR/RJ45 connectors not shown) and controlled by a battery-powered, portable DMX master device 410 operating as a DMX master that may include Wi-Fi interface 420 supporting ArtNET and/or sACN protocols for transporting DMX information over Wi-Fi interface 420. Optional connection 408A may provide "token ring" interconnectivity between DMX slaves 402-406 and DMX master 410, whereby status and control information may be circulated throughout DMX universe 400 and selectively monitored (e.g., via mobile device 412) as discussed in more detail below.

Mobile device 412 may similarly be configured with an ArtNET/sACN enabled, Wi-Fi interface 422 that may used to monitor/control DMX information pertinent to DMX universe 400. In one embodiment, such controlled information may be displayed via a person-machine interface (PMI) 414 that may be customized to control all DMX slave devices that may exist within DMX universe 400.

Information associated with any one or more DMX channels (e.g., 6 channels) that may be associated with any of the DMX slave devices (e.g., DMX Slave Device 404) within DMX universe 400 may be displayed within control area 426 of PMI 414. As per an example, PMI 414 may indicate that Device Name (e.g., "DMX Slave #2") having DMX Description (e.g., "6CH DMX") may be currently under control by PMI 414 of mobile device 412.

DMX Slave Device 404 may, for example, require four independently addressable DMX channels in order to command each of its four lighting features (e.g., red channel 428, green channel 430, blue channel 432 and white channel 434). In one embodiment, sliders 428-434 may be visually projected onto PMI 414 which may be touch sensitive. As such, a user of mobile device 412 may use his or her finger to control the height of sliders 428-434 anywhere between and including a minimum height that may correspond to a minimum intensity level (e.g., 0% intensity) and a maximum height that may correspond to a maximum intensity level (e.g., 100% intensity).

Similarly, two independently addressable DMX channels may be used to control each mechanical feature (e.g., azimuth and elevation angles) of DMX Slave Device #2. In one embodiment, sliders 436-438 may be visually projected onto PMI 414 which may be touch sensitive. As such, a user of mobile device 412 may use his or her finger to control the height of sliders 436-438 anywhere between and including a minimum height that may correspond to minimum elevation and azimuth angles and a maximum height that may correspond to minimum and maximum elevation and azimuth angles.

Once the user of mobile device 412 updates configurable interface 426 by adjusting the height of any one or more sliders 428-438, such information may be transmitted via ArtNET-compliant Wi-Fi interface 422 to portable DMX master device 410 via Wi-Fi interface 420 and then communicated over a DMX interface (e.g., RS-485 interface 408) to DMX Slave Device 404. Once received, DMX Slave Device 404 may update the intensity of any of its red, green, blue and/or white color channels and/or the elevation/azimuth angle that such light may be directed and may circulate the information via "token ring" connectivity established via connections 408 and 408A (e.g., for monitoring purposes).

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A lighting controller, comprising:
   a battery configured to provide operational power;
   a CPU coupled to receive the operational power from the battery;
   a first DMX interface coupled to the CPU and configured to transmit DMX data received from the CPU to the DMX universe, wherein the DMX data is received wirelessly by the CPU; and
   a second DMX interface coupled to the CPU and configured to receive data from the DMX universe.

2. The lighting controller of claim 1, further comprising a USB port configured to receive a power signal to charge the battery.

3. The lighting controller of claim 1, wherein the data received from the second DMX interface includes non-lighting data.

4. The lighting controller of claim 3, wherein the CPU is configured to wirelessly transmit the data received from the second DMX interface.

5. A network, comprising:
   a DMX universe;
   a DMX controller coupled to the DMX universe, the DMX controller including,
     a first DMX interface configured to receive data from the DMX universe; and
     a second DMX interface configured to transmit data to the DMX universe; and
   a mobile device wirelessly coupled to the DMX controller, the mobile device including a display configured to display the data received from the first DMX interface.

6. The network of claim 5, wherein the mobile device includes a person machine interface configured to allow a user to generate lighting data transmitted by the second DMX interface.

7. The network of claim 5, wherein the mobile device includes a person machine interface configured to allow a user to generate non-lighting data transmitted by the second DMX interface.

8. The network of claim 5, wherein the mobile device includes a person machine interface configured to display lighting data received from the first DMX interface.

9. The network of claim 5, wherein the mobile device includes a person machine interface configured to display non-lighting data received from the first DMX interface.

10. A method of using a DMX controller, comprising:
    providing power to the DMX controller using a battery;
    charging the battery with power received from a USB port;
    configuring the DMX controller to receive DMX control data; and
    transmitting the received DMX control data to a DMX universe from the DMX controller; and
    receiving the DMX control data from the DMX universe by the DMX controller.

11. The method of claim 10, wherein the DMX controller is configured to receive the DMX control data from a USB port.

12. The method of claim 10, wherein the DMX controller is configured to receive the DMX control data from a memory device coupled to a memory slot of the DMX controller.

13. The method of claim 10, wherein the DMX controller is configured to receive the DMX control data wirelessly.

14. The method of claim 13, wherein the DMX controller is configured to receive the DMX control data via Bluetooth.

15. The method of claim 13, wherein the DMX controller is configured to receive the DMX control data via wi-fi.

16. The method of claim 15, wherein the DMX controller is configured to receive the DMX control data using Art-NET.

17. The method of claim 15, wherein the DMX controller is configured to receive the DMX control data using sACN.

18. The method of claim 10, further comprising wirelessly transmitting the DMX control data to a mobile device.

* * * * *